United States Patent
Nishimura et al.

(10) Patent No.: US 12,084,552 B2
(45) Date of Patent: *Sep. 10, 2024

(54) POLY(VINYL ALCOHOL) FILM AND PRODUCTION METHOD FOR POLARIZING FILM

(71) Applicant: SEKISUI CHEMICAL CO., LTD., Osaka (JP)

(72) Inventors: Yohei Nishimura, Osaka (JP); Yasunari Kusaka, Osaka (JP); Nami Nakajima, Osaka (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 972 days.

This patent is subject to a terminal disclaimer.

(21) Appl. No.: 17/041,585

(22) PCT Filed: Mar. 28, 2019

(86) PCT No.: PCT/JP2019/013876
§ 371 (c)(1),
(2) Date: Sep. 25, 2020

(87) PCT Pub. No.: WO2019/189695
PCT Pub. Date: Oct. 3, 2019

(65) Prior Publication Data
US 2021/0032421 A1    Feb. 4, 2021

(30) Foreign Application Priority Data

Mar. 30, 2018 (JP) .................................. 2018-070357

(51) Int. Cl.
| | | |
|---|---|---|
| C08J 5/18 | (2006.01) | |
| C08F 116/06 | (2006.01) | |
| C08K 5/053 | (2006.01) | |
| C08L 29/04 | (2006.01) | |
| G02B 5/30 | (2006.01) | |

(52) U.S. Cl.
CPC .............. C08J 5/18 (2013.01); C08F 116/06 (2013.01); C08K 5/053 (2013.01); C08L 29/04 (2013.01); G02B 5/3033 (2013.01); *C08J 2329/04* (2013.01); *C08J 2471/02* (2013.01)

(58) Field of Classification Search
CPC .......... C08J 5/18; C08F 116/06; C08K 5/053; C08L 29/04; G02B 5/3033
See application file for complete search history.

(56) References Cited

U.S. PATENT DOCUMENTS

| 7,083,849 B1 | 8/2006 | Albrecht et al. |
|---|---|---|
| 2017/0275394 A1 | 9/2017 | Mori et al. |

FOREIGN PATENT DOCUMENTS

| CN | 1356344 | 7/2002 | |
|---|---|---|---|
| CN | 106715493 | 5/2017 | |
| EP | 2 336 199 | 6/2011 | |
| JP | 6-136151 | 5/1994 | |
| JP | 2002-236214 | 8/2002 | |
| JP | 3422759 | 4/2003 | |
| JP | 2004-279651 | 10/2004 | |
| JP | 2007-58176 | 3/2007 | |
| JP | 2009-221462 | 10/2009 | |
| JP | 2012-82313 | 4/2012 | |
| JP | 2013-242342 | 12/2013 | |
| JP | 2015-38168 | 2/2015 | |
| JP | 2018-28662 | 2/2018 | |
| JP | 2018-70357 | 5/2018 | |
| KR | 10-2013-0107465 | 10/2013 | |
| WO | 2015/020046 | 2/2015 | |
| WO | WO-2015020046 A1 * | 2/2015 | ............ C08F 216/06 |
| WO | 2017/033750 | 3/2017 | |
| WO | 2018/003671 | 1/2018 | |

OTHER PUBLICATIONS

English machine translation of WO2015020046. (Year: 2015).*
International Search Report issued Jun. 25, 2019 in International (PCT) Application No. PCT/JP2019/013876 with English-language translation.
Notice of Allowance issued Jan. 22, 2019 in Japanese Patent Application No. 2018-145405 with English-language translation.
Office Action issued Sep. 25, 2018 in Japanese Patent Application No. 2018-145405 with English-language translation.

* cited by examiner

Primary Examiner — John E Uselding
(74) Attorney, Agent, or Firm — Wenderoth, Lind & Ponack, L.L.P.

(57) ABSTRACT

A polyvinyl alcohol film comprising a vinyl alcohol-based polymer, wherein, when the polyvinyl alcohol film is measured by a solid echo method using pulse NMR at 80° C. for waveform separation of a free induction decay curve of 1H spin-spin relaxation into three curves derived from three components a component A, a component B, and a component C in order of short relaxation time, the component A has a resulting relaxation time of 0.0083 milliseconds or more and 0.0093 milliseconds or less, and a resulting component ratio of 10% or more and 35% or less.

8 Claims, No Drawings

POLY(VINYL ALCOHOL) FILM AND PRODUCTION METHOD FOR POLARIZING FILM

TECHNICAL FIELD

The present invention relates to a polyvinyl alcohol film for use, for example, in forming a polarizing film, and a method for manufacturing a polarizing film from the polyvinyl alcohol film.

BACKGROUND ART

Conventionally, in a liquid crystal display apparatus or the like, a polarizing film formed from polyvinyl alcohol (hereinafter also referred to as "PVA") film has been widely used. The polarizing film is usually obtained by uniaxially stretching a PVA film, dyeing the film, and performing a fixation treatment to the dye with a boron compound or the like.

For example, in PTL 1, a PVA film for polarizing films which has a film width of 2 m or more, a retardation difference between two points separated by 1 cm in the width direction of 5 nm or less, and a retardation difference between two points separated by 1 m in the width direction of 50 nm or less is disclosed. In PTL 1, it is said that the degree of saponification of PVA is preferably 95 mol % or more, most preferably 99.5 mol % or more from the viewpoints of polarization performance and durability.

CITATION LIST

Patent Literature

PTL1: Japanese Patent No. 3422759

SUMMARY OF INVENTION

Technical Problem

The PVA film described in PTL1 has good polarization performance of a polarizing film with an increased degree of saponification. However, the PVA film has the problem of the occurrence of wrinkles and coalescence between films in the manufacturing process of a polarizing film, particularly in the stretching step in water (wet stretching step). Further improvement in the PVA film is therefore required.

Accordingly, an object of the present invention is to provide a PVA film from which a polarizing film having good polarization performance can be manufactured with a rare occurrence of wrinkles and coalescence, and a method for manufacturing a polarizing film from the PVA film.

Solution to Problem

Through extensive study on the problem, the present inventors have found that the problem can be solved by controlling the relaxation time of a component A measured by pulse NMR to a specified value or less and the component ratio thereof within a specified range, so that the present invention has been accomplished.

The present invention provides the following items [1] to [8].

[1] A polyvinyl alcohol film comprising a vinyl alcohol-based polymer, wherein, when the polyvinyl alcohol film is measured by a solid echo method using pulse NMR at 80° C. for waveform separation of a free induction decay curve of 1H spin-spin relaxation into three curves derived from three components a component A, a component B, and a component C in order of short relaxation time, the component A has a resulting relaxation time of 0.0083 milliseconds or more and 0.0093 milliseconds or less, and a resulting component ratio of 10% or more and 35% or less.

[2] The polyvinyl alcohol film according to the above item [1], wherein the vinyl alcohol-based polymer has a degree of saponification of 99 mol % or more.

[3] The polyvinyl alcohol film according to the above item [1] or [2], wherein the vinyl alcohol-based polymer has a degree of polymerization of 2000 or more and 4000 or less.

[4] The polyvinyl alcohol film according to any one of the above items [1] to [3], comprising a plasticizer.

[5] The polyvinyl alcohol film according to any one of the above items [1] to [4], for use in a polarizing film.

[6] A method for manufacturing a polarizing film comprising using the polyvinyl alcohol film according to any one of the above items [1] to [5].

[7] The method for manufacturing a polarizing film according to the above item [6], comprising steps of dyeing the polyvinyl alcohol film, stretching the polyvinyl alcohol film, and performing a fixation treatment to the dyed polyvinyl alcohol film.

[8] The method for manufacturing a polarizing film according to the above item [7], wherein the fixation treatment is performed after stretching of the polyvinyl alcohol film.

Advantageous Effects of Invention

By using the PVA film of the present invention, a polarizing film having good polarization performance can be manufactured with less occurrences of wrinkles and coalescence.

DESCRIPTION OF EMBODIMENTS

The present invention is described in more detail as follows.

[PVA Film]

The PVA film of the present invention includes a component A having relaxation time of 0.0083 milliseconds or more and 0.0093 milliseconds or less, and a component ratio of 10% or more and 35% or less measured by a solid echo method using pulse NMR at 80° C.

In measurement of a PVA film by pulse NMR, a free induction decay curve of the 1H spin-spin relaxation is usually obtained. The resulting free induction decay curve can be subjected to waveform separation into three curves derived from three components a component A, a component B, and a component C in order of short relaxation time. In other words, the measured free induction decay curve is a superimposition of the free induction decay curves derived from three components the component A, the component B and the component C. The analysis method with separation into three components using pulse NMR like this is known, and examples of literature include JP 2018-2983 A.

The component A is a component having a short relaxation time in pulse NMR measurement, referring to a hard component with low molecular mobility. In contrast, the component C is a component having a long relaxation time in pulse NMR measurement, referring to a soft component with high molecular mobility. The component B has a relaxation time in between those of the component A and the component C in pulse NMR measurement, and therefore having molecular mobility in between those of the component A and the component C. The component ratio refers to a ratio based on the total amount of the component A, the component B and the component C.

In the present invention, the relaxation time and the component ratio of the component A are controlled to the specified ranges described above, so that while a polarizing film manufactured from the PVA film has good polarization performance, the occurrence of wrinkles and coalescence in manufacturing of the polarizing film can be prevented.

In contrast, with a relaxation time of less than 0.0083 milliseconds or a component ratio of the component A of more than 35%, the PVA film is easily broken when stretched, due to the too hard component A or the too much amount of the component A.

Also, with a relaxation time of more than 0.0093 milliseconds or a component ratio of the component A of less than 10%, the component A becomes too soft or the amount of the component A becomes too less. In that case, wrinkles and coalescence tend to occur in the film in manufacturing of a polarizing film, and the polarization performance tends to decrease.

From the viewpoint of achieving excellent polarization performance of a polarizing film in parallel with suppressing the occurrence of wrinkles and coalescence, the relaxation time is preferably 0.0092 milliseconds or less, more preferably 0.0089 milliseconds or less, still more preferably 0.0087 milliseconds or less. Also, the relaxation time is preferably 0.0084 milliseconds or more.

From the viewpoint of suppressing the occurrence of breakage in stretching of the PVA film, the component ratio of the component A is preferably 32% or less, more preferably 30% or less. Also, from the viewpoint of suppressing the occurrence of wrinkles and coalescence, the component ratio of the component A is preferably 15% or more, more preferably 18% or more, still more preferably 20% or more.

In the present invention, the pulse NMR measurement is performed after a PVA film is aged in a thermostat at 23° C. and 50% RH for 48 hours in order to suppress the variance in evaluation results due to change in water content in the pulse NMR measurement.

Also, when a PVA film is aged alone, a curve may occur at an end. The occurrence of the curve severely spoils the uniformity of a sample when the film sample is rolled up for introduction into an NMR measurement tube, causing the following problem(s): errors occur due to apparent reduction in the relaxation time resulting from non-uniformity of the magnetic field or the amount introduced in a measurement region decreases. In order to avoid the problems, the PVA film is fixed with a specified UV release tape (trade name "SELFA-SE", manufactured by Sekisui Chemical Co., Ltd.) and then aged. By aging after fixation to the specified UV release tape, high fixability, low adhesive residue, and easy peelability can be obtained to suppress the variation in evaluation results.

Fixation between the PVA film and the UV release tape can be made using a laminator. On this occasion, in order to prevent damages caused by adhesion or entanglement of the PVA film and the UV release tape to a laminator roll, the PVA film and the UV release tape may be inserted between a hard substrate such as an SUS plate and a cardboard having a thickness of 1 mm or less and a base material for lamination. As the base material, a release film or the like not sticking to the PVA film and the UV release tape is used. Also, in order to achieve reduction of wrinkles and curves during fixation, the lamination is performed such that the roll width direction of the UV release tape is orthogonal to the longitudinal direction of the PVA film.

A film sample with a low water content fixed with a UV release tape and then aged may have wrinkles. When wrinkles have occurred after aging, the UV release tape is detached through an irradiation step, and then the wrinkles of the PVA film are smoothed once by a laminator. The PVA film is fixed by lamination with a new SELFA-SE again and subjected to the aging step described above. The procedure is repeated until the wrinkles disappear, so that the present evaluation can be performed.

The measurement methods of the relaxation time and the composition ratio of the component A are as described in Examples.

(PVA-Based Polymer)

The PVA film of the present invention comprises a vinyl alcohol-based polymer (also referred to as "PVA-based polymer"). The PVA-based polymer is obtained by polymerizing a vinyl ester and saponifying or hydrolyzing the resulting polymer. It is preferable that the degree of saponification of the PVA-based polymer for use in the present invention be 99 mol % or more.

With a degree of saponification of 99 mol % or more, the PVA film has an enhanced strength, and is unlikely to be dissolved in a dyeing solution, a fixation treatment solution, etc., used in the steps for manufacturing a polarizing film, so that a polarizing film having high polarization performance tends to be easily obtained.

From these viewpoints, the degree of saponification is preferably 99.2 mol % or more, more preferably 99.4 mol % or more. Also, the degree of saponification may be 100 mol % or less, and from the viewpoint of handleability of the PVA film, being more preferably 99.9 mol % or less, still more preferably 99.7 mol % or less.

The method for controlling the degree of saponification is not particularly limited and can be appropriately controlled by saponification or hydrolysis conditions. The degree of saponification is a value obtained by measurement in accordance with JIS K 6726. A PVA film may be subjected to, for example, a plurality of cycles (e.g., 100 cycles) of Soxhlet extraction with methanol to wash plasticizer or the like, so that the degree of saponification of the PVA-based polymer can be measured.

Examples of the vinyl ester for use include vinyl acetate, vinyl formate, vinyl propionate, vinyl butylate, isovinyl butylate, vinyl pivalate, vinyl versatate, vinyl caproate, vinyl caprylate, vinyl laurate, vinyl palmitate, vinyl stearate, vinyl oleate, and vinyl benzoate. In particular, vinyl acetate is preferred.

Although the PVA-based polymer may be an unmodified PVA or a modified PVA, an unmodified PVA is preferred. In the case of a modified PVA, the polymer obtained by polymerizing the vinyl ester described above may be changed to a copolymer of the vinyl ester and another monomer. Examples of the other monomers used here, i.e., comonomers to be copolymerized, include olefins such as ethylene, propylene, 1-butene and isobutene, (meth)acrylic acid and salts thereof, (meth)acrylic acid esters such as methyl (meth)acrylate, ethyl (meth)acrylate, n-propyl (meth)acrylate, i-propyl (meth)acrylate, n-butyl (meth)acrylate, and 2-ethylhexyl (meth)acrylate, (meth)acrylamide derivatives such as acrylamide, n-methyl acrylamide, N-ethyl acrylamide, N,N-dimethyl acrylamide, (meth)acrylamide propane sulfonic acid and salts thereof, N-vinylamides such as N-vinylpyrrolidone, vinyl ethers such as methyl vinyl ether, ethyl vinyl ether, n-propyl vinyl ether, i-propyl vinyl ether, and n-butyl vinyl ether, nitriles such as acrylonitrile and methacrylonitrile, halogenated vinyls such as vinyl chloride and vinylidene chloride, allyl compound such as allyl acetate and allyl chloride, maleic acid and salts or esters thereof, itaconic acid and salts or esters thereof, vinylsilyl compounds such as vinyltrimethoxysilane, and isopropynyl acetate. One of these comonomers may be used alone, or two or more thereof may be used in combination.

In the case where these comonomers are copolymerized to make a modified PVA, the amount modified is preferably 15 mol % or less, more preferably 5 mol % or less.

In the present invention, the degree of polymerization of the PVA-based polymer is preferably 2000 or more and 4000 or less. With a degree of polymerization in the above range, the relaxation time of the component A and the component ratio of the component A are easily controlled in the specified ranges described above. Also, control to the lower limit or more allows the PVA film to be unlikely to be dissolved in a dyeing solution and a fixation treatment solution used in the polarizing film manufacturing steps, so that a polarizing film having high polarization performance can be easily obtained. Also, control to the upper limit or less allows the solubility of PVA to solvent to increase, so that the film can be easily formed.

From the viewpoint described above, the degree of polymerization of the PVA-based polymer is more preferably 2300 or more, still more preferably 2500 or more, and more preferably 3500 or less, still more preferably 3000 or less. The degree of polymerization of the PVA-based polymer can be measured in accordance with JIS K 6726. The PVA film is subjected to, for example, a plurality of cycles (e.g., 100 cycles) of Soxhlet extraction with methanol to wash plasticizer or the like, so that the degree of polymerization of the PVA-based polymer can be measured.

The PVA-based polymer content in the PVA film is preferably 50 mass % or more, more preferably 60 mass % or more, still more preferably 75 mass % or more, based on the total amount of the PVA film. With a PVA-based polymer content controlled to the lower limit or more, the relaxation time and the component ratio of the component A can be easily controlled within specified ranges.

Also, the PVA-based polymer content in the PVA film may be 100 mass % or less, being preferably 97 mass % or less, more preferably 95 mass % or less, in order to allow more than a certain amount of a plasticizer to be contained.

The PVA film may contain components other than the PVA-based polymer, the components including additives such as a plasticizer, a surfactant, a preservative and a defoaming agent, preferably including a plasticizer. Containing a plasticizer makes it easy to control the component ratio of the component A in the PVA film to the upper limit or less.

(Plasticizer)

As the plasticizer, a polyhydric alcohol is suitably used. Examples of the polyhydric alcohol include ethylene glycol, glycerol, propylene glycol, diethylene glycol, diglycerol, triethylene glycol, tetraethylene glycol, dipropylene glycol, tripropylene glycol, trimethylol propane, polyethylene glycol, and polypropylene glycol. Here, a polyethylene glycol or polypropylene glycol having an average molecular weight of 200 or more and 600 or less, preferably 250 or more and 500 or less, may be used.

One of the polyhydric alcohols may be added as the plasticizer, or two or more thereof may be added. Among those described above, glycerol, polyethylene glycol, polypropylene glycol, trimethylol propane, diethylene glycol, diglycerol, triethylene glycol, and tetraethylene glycol are preferred; glycerol, polyethylene glycol, and trimethylol propane are more preferred; and polyethylene glycol and trimethylol propane are particularly preferred.

The plasticizer content in the PVA film is preferably 1 part by mass or more and 25 parts by mass or less per 100 parts by mass of the PVA-based polymer. With a plasticizer content controlled within the above range, the component ratio of the component A can be easily controlled within a specified range. Also, control to the lower limit or more improves the dyeing properties and stretching properties. On the other hand, control to the upper limit or less prevents the PVA film from being excessively softened, so that degradation of handleability during dyeing and stretching can be prevented.

The plasticizer content is more preferably 3 parts by mass or more, still more preferably 4 parts by mass or more, furthermore preferably 6 parts by mass or more, and more preferably 20 parts by mass or less, still more preferably 16 parts by mass or less per 100 parts by mass of the PVA-based polymer.

Examples of the surfactant are not particularly limited and include an anionic surfactant and a nonionic surfactant. The surfactant content in the PVA film is, for example, 0.1 parts by mass or more and 1 part by mass or less, per 100 parts by mass of the PVA-based polymer.

Examples of the preservative include an isothiazolone compound, glutaraldehyde, and a quaternary ammonium compound. The amount of the preservative blended in the PVA film is, for example, 0.1 parts by mass or more and 1 part by mass or less per 100 parts by mass of the PVA-based polymer.

The thickness of the PVA film is not particularly limited, being, for example, 5 μm or more and 200 μm or less, preferably 10 μm or more and 40 μm or less, such that the thickness is appropriate for a polarizing film after stretching. The measurement of the thickness is not particularly limited and may be performed by taking an average in the measurement range by using a micrometer "MDH-25M" manufactured by Mitutoyo Corporation.

The PVA film of the present invention may be used for various applications, and preferably used for a polarizing film as described below.

[Method for Manufacturing PVA Film]

The PVA film of the present invention can be obtained by film formation of the PVA-based polymer or a PVA composition including the PVA-based polymer to which additives such as plasticizer are added. More specifically, the PVA film can be obtained by applying a PVA solution, which is obtained by diluting the PVA-based polymer or the PVA composition with a solvent, on a support and drying the applied solution.

The solvent for use is not particularly limited so long as the PVA-based polymer can be dissolved. Examples of the solvent include water, dimethyl sulfoxide, dimethyl formamide, dimethyl acetoamide, N-methylpyrrolidone, ethylene diamine, and diethylene triamine. Also, the polyhydric alcohol for use as plasticizer may be used as solvent. One of these solvents may be used alone, or two or more thereof may be used in combination.

The PVA-based polymer concentration in the PVA solution is not particularly limited, being preferably 3 mass % or more and 40 mass % or less, more preferably 7 mass % or more and 20 mass % or less. With a concentration controlled in the range, the relaxation time and the component ratio of the composition A of the PVA film to be manufactured by the present manufacturing method tend to be controlled in specified range. Also, control to the lower limit or more prevents the drying time from being prolonged more than necessary. Further, control of the concentration to the upper limit or less allows the solution to be easily applied and cast.

Also, among the solvents described above, water is preferably used. The amount of water used is preferably 1.1 times or more and 30 times or less, more preferably 4 times or more and 15 times or less, that of the PVA-based polymer on a mass basis.

The PVA solution is prepared by blending the PVA-based polymer and additives such as a plasticizer used on an as needed basis into a solvent to be heated and retaining the solution under the heated conditions for a specified time. In the PVA solution thus prepared, the PVA-based polymer and the additives such as a plasticizer appropriately blended are dissolved.

Here, the temperature of the heated solution may be less than the boiling temperature of the solvent, and, for example, being preferably 80° C. or more and less than 100° C., or 90° C. or more and 97° C. or less. Also, the time for retaining the PVA solution at the temperature is preferably 15 minutes or more, more preferably 30 minutes or more, and preferably 2 hours or less, more preferably 1 hours and 30 minutes or less.

The PVA solution is retained at a specified temperature for a given time as described above and then cooled. The temperature lowering rate during cooling is preferably 0.2° C./min or more and 1.5° C./min or less, more preferably 0.3° C./min or more and 1.2° C./min or less, still more preferably 0.3° C./min or more and 0.8° C./min or less. The PVA solution is cooled to, for example, 20° C. or more and 60° C. or less, preferably 20° C. or more and 50° C. or less, more preferably 30° C. or more and 50° C. or less, still more preferably 30° C. or more and 40° C. or less.

In the present invention, the PVA solution is retained at a specified temperature for a given time, so that the PVA-based polymer or the PVA-based polymer and the plasticizer are appropriately dissolved in the solvent. When the solution is cooled at the temperature lowering rate, moderate crystallization of the PVA-based polymer is facilitated, so that the relaxation time of the component A and the component ratio of the component A can be easily controlled in the specified ranges described above.

The PVA solution cooled to the temperature described above is applied on a support. The application of the PVA solution to the support may be performed by a known application method or may be performed by casting or the like. The support is not particularly limited so long as the applied PVA solution can be retained on the surface and the PVA film obtained by the film formation can be supported. Examples of the support may include a resin film made of polyethylene, polypropylene, polyethylene terephthalate, or acryl-based resin, and a support made of other than resin film such as a glass plate and a metal plate.

The PVA solution applied on the support is subjected to film formation by heat-drying, so that a PVA film is obtained. The heat-drying may be performed, for example, at a temperature of 60° C. or more and 80° C. or less for 1 hour or more and 3 hours or less, preferably at a temperature of 65° C. or more and 75° C. or less for 1 hour and 30 minutes or more and 2 hours and 30 minutes or less. Through film formation of the PVA film under the drying conditions, crystallization of the PVA-based polymer is highly facilitated, so that the amount of the component A having a specified relaxation time can be easily controlled in a specified range. The PVA film formed on the support may be appropriately detached from the support.

The relaxation time of the component A and the component ratio of the component A in the PVA film may be controlled, for example, by controlling the raw material of the PVA film, specifically by controlling the degree of saponification and the degree of polymerization of the PVA-based polymer, the blending or non-blending of a plasticizer, the amount of the plasticizer blended, the type of the plasticizer, etc. In the present manufacturing method, by controlling the manufacturing conditions in addition to the raw material of the PVA film, the relaxation time of the component A and the component ratio of the component A can be in the specified ranges described above. Specifically, by retaining the PVA solution at a relatively high temperature for a given time as described above, then cooling the solution at a relatively slow temperature lowering rate, applying the cooled solution, and drying the applied solution under drying conditions with relatively low temperature for a long time to obtain a PVA film, the relaxation time of the component A and the component ratio of the component A can be controlled in the specified ranges described above.

The method for manufacturing a PVA film is not limited to the method described above, so long as the relaxation time of the component A and the component ratio of the component A can be in the specified ranges described above by moderately facilitating the crystallization of the PVA-based polymer and appropriately controlling the degree of facilitation of the crystallization. For example, in film formation of a PVA film by extrusion molding using an extruder in another specific example of the manufacturing method, the relaxation time of the component A and the component ratio of the component A can be controlled in the specified ranges described above by controlling the manufacturing conditions in the extruder.

[Manufacturing of Polarizing Film]

The manufacturing method of a polarizing film of the present invention is a method for manufacturing a polarizing film using the PVA film described above. Specifically, the method comprises a dyeing step of dyeing the PVA film, a stretching step of stretching the PVA film, and a fixation treatment step of fixing the dyed PVA film.

In the present manufacturing method, although stretching of the PVA film may be performed after dyeing of the PVA film, during dyeing, or before dyeing, stretching during dyeing is preferred. The fixation treatment is a treatment performed after dyeing, the treatment may be performed in parallel with stretching or after stretching, preferably the fixation treatment is performed after stretching.

(Dyeing Step)

Dyeing of the PVA film may be performed using a dye. Examples of the dyes for use include a dichroic dye such as a mixture of iodine and potassium iodide, DirectBlack 17, 19 and 154, DirectBrown 44, 106, 195, 210 and 223, DirectRed 2, 23, 28, 31, 37, 39, 79, 81, 210, 242 and 247, DirectBlue 1, 15, 22, 78, 90, 08, 151, 158, 202, 236, 249 and 270, DirectViolet 9, 12, 51 and 98, DirectGreen 1 and 85, DirectYellow 8, 12, 44, 86 and 87, and DirectOrange 26, 39, 106 and 107. One of these dyes may be used alone, or two or more thereof may be used in combination.

Although dyeing may be performed by a method including immersing the PVA film in a dye solution containing the dye, a method including applying a dye solution to the PVA film, or the like, the method including immersing the PVA film in a dye solution is preferred. Although the solvent for diluting the dye in the dye solution may be any which can dissolve the dye, water is preferred. The concentration of the dye in the dye solution is, for example, 0.5 mass % or more and 20 mass % or less, preferably 1 mass % or more and 10 mass % or less.

Although it is preferable that dyeing be performed after the PVA film formed on a support is detached from the support in the manufacturing method of PVA, the PVA film formed on the support may be dyed without being detached.
(Stretching Step)

Stretching of the PVA film is performed by uniaxially stretching the PVA film. Although the uniaxial stretching method may be any one of a wet stretching method and a dry-heat stretching, a wet stretching method is preferred.

The wet stretching method is a method including stretching in warm water, and stretching may be performed in the dye solution during dyeing, or in a fixation treatment solution described below during fixation treatment. It is, however, preferable that the wet stretching be performed in the dye solution. The dry-heat stretching method is a method including stretching while heating in the air by radiation heating, hot air heating, hot plate heating, roll heating, or the like.

Even when a wet stretching method is applied, the PVA film of the present invention has a rare occurrence of wrinkles and coalescence, so that good productivity can be achieved.

Stretching of the PVA film is preferably performed by the same manner as in dyeing, i.e., the PVA film formed on a support in the manufacturing method of PVA is detached from the support and stretched alone. In the case of the support of resin film, however, a laminate of the support and PVA may be stretched without detachment of the PVA film from the support.

The temperature of the PVA film when stretched (stretching temperature) may be, for example, 20° C. or more and 180° C. or less, though different depending on the stretching method.

In the particular case where the PVA film alone is subjected to wet stretching, it is preferable that the stretching be performed in a temperature range of, for example, 20° C. or more and 80° C. or less. Also, in the case where the PVA film alone is subjected to dry-heat stretching, it is preferable that the stretching be performed in a temperature range of, for example, 50° C. or more and 180° C. or less. In contrast, in the case of stretching in a state supported with a support made of resin film (i.e., stretching a laminate of a support and the PVA film), the stretching may be performed at a temperature equal to or more than the stretching temperature of the resin film and equal to or less than the temperature at which no deterioration nor decomposition of the support occurs.

The stretching ratio of the PVA film is preferably 4 times or more, more preferably 5 times or more. By increasing the stretching ratio, the polarization performance of the polarizing film can be enhanced.

The stretching ratio of the PVA film is preferably 8 times or less, more preferably 7 times or less. With the stretching ratio equal to or less than these upper limits, the PVA film can be uniformly stretched without breakage.
(Fixation Treatment Step)

In manufacturing of a polarizing film, after dyeing of a PVA film, a fixation treatment is performed to surely fix a dye to the PVA film. The fixation treatment may be performed by a known method including, for example, immersing a PVA film in a fixation treatment solution containing at least one of boric acid and a boron compound. Examples of the fixation solution include an aqueous solution dissolving at least one of boric acid and a boron compound. The concentration of boric acid and a boron compound in total in the fixation treatment solution is, for example, 0.5 mass % or more and 20 mass % or less, preferably 1 mass % or more and 10 mass % or less.

The temperature of the fixation treatment solution in the fixation treatment is not particularly limited, being, for example, 20 to 90° C. The fixation treatment may be performed in parallel with stretching after dyeing or may be performed after stretching, being preferably performed after stretching.

In the present manufacturing method, a polarizing film is obtained through the steps of dyeing, stretching and fixation treatment as described above, and the PVA film may be dried after dyeing, stretching and fixation treatment. Also, the PVA film may be washed with water before drying on an as needed basis. Drying may be performed by natural drying and may be by heat drying for acceleration of drying rate.

The polarizing film of the present invention is used, for example, as a polarizing plate, which is made by laminating a protective film on both sides or a single side of the polarizing film. As the protective film, a cellulose triacetate (TEC) film, a cellulose acetate butylate (CEB) film, an acrylic-based film, a polyester-based film, etc., can be used. As the adhesive for laminating the protective film to the polarizing film, a PVA-based adhesive and a urethane-based adhesive may be used, and a PVA-based adhesive is preferred. Also, the polarizing film may be used for various applications including, for example, a liquid crystal display unit.

The PVA film of the present invention has a rare occurrence of wrinkles and coalescence in the manufacturing step of a polarizing film due to having a relaxation time of the component A and a component ratio of the component A within specified ranges. Also, due to having a relaxation time of the component A and a component ratio of the component A within specified ranges, the resulting polarizing film has good polarization performance.

EXAMPLES

The present invention is further specifically described with reference to Examples, though the present invention is not limited thereto.

The measurement method and the evaluation method in the present Examples are as follows.
(1) Measurement of Relaxation Time and Component Ratio of Component A A film sample of the PVA films obtained in Examples and Comparative Examples were laminated to a UV release tape (trade name "SELFA-SE" manufactured by Sekisui Chemical Co., Ltd.) to be fixed using a laminator (laminator HOTDOG Leon 13DX manufactured by Lami Corporation Inc.) set at a temperature of 60° C. and a speed of 5. Subsequently, the fixed PVA film was aged in a thermostat at 23° C. and 50% RH for 48 hours. In order to achieve fixation of the PVA film to the UV release tape by the laminator, both are sandwiched with SUS plate having a thickness of 1 mm or less and a release-treated PET film having a thickness of 50 μm.

On the occasion of fixation, the lamination was performed such that the roll width direction of the UV release tape is perpendicularly crossed with the longitudinal direction of the PVA film. The longitudinal direction of the PVA film is the same as the cutting direction of the PVA film when rolled into a cylindrical form for introduction into an NMR tube (longitudinal direction of the film in a cylindrical form).

The fixed film sample was exposed to UV rays having a wavelength of 365 nm to receive an energy of 1000 mJ/cm$^2$ at the irradiated surface using a UV irradiation apparatus "manufactured by ORC Manufacturing Co., Ltd., apparatus model: JL-4300-3, lamp model: IML-4000", so that the UV release tape was detached from the film sample.

A film sample having a low water content may wrinkle when aged after fixation with an UV release tape. When wrinkles occur after aging, the UV release tape is detached through the irradiation step, the wrinkles of the PVA film are then smoothed once by a laminator. Fixation is performed through lamination using a new SELFA-SE, and the aging step is performed. The operation may be repeated until the wrinkles disappear.

A film sample detached from the UV release tape having a weight of about 700 mg was rolled into a cylindrical form and introduced into a sample tube made of glass having a diameter of 10 mm (manufactured by BRUKER, item No. 1824511, diameter: 10 mm, length: 180 mm, flat bottom), such that the height was controlled to 15 mm. The sample was installed in a pulse NMR apparatus ("the Minispec MQ20" manufactured by BRUKER), and the temperature was raised stepwise from 25° C. (retained for 40 minutes), to 40° C. (retained for 40 minutes), to 60° C. (retained for 40 minutes) and to 80° C. (retained for 10 minutes). The measurement was performed by a solid echo method at 80° C., and the resulting free induction decay curve of 1H spin-spin relaxation was subjected to waveform separation into three curves derived from three components a component A, a component B, and a component C. The waveform separation was performed by fitting to both a Gaussian model and an exponential model. From the curves derived from the three components obtained in each measurement, the ratio of each component was obtained. The same type of measurement was performed twice to obtain the ratio of each component as an average.

Using analytical software "TD-NMRA (Version 4.3, Rev. 0.8)" of BRUKER, the component A was fitted to a Gaussian model and the component B and the component C were fitted to an exponential model according to the product manual. Also, in the analysis, fitting was performed using points up to 0.6 milliseconds in the relaxation curve.

Also, the following equation was used in the fitting.

$$Y = A1 * \exp(-1/w1*(t/T2A)\hat{}w1) + B1 * \exp(-1/w2*(t/T2B)\hat{}w2) + C1 * \exp(-1/w3*(t/T2C)\hat{}w3),$$

where w1 to w3 are Weibull coefficients; w1 is 2; w2 and w3 are 1; A1, B1 and C1 are the component ratios of the component A, the component B and the component C, respectively; T2A, T2B and T2C represent the relaxation times of the component A, the component B and the component C, respectively; and t represents time.

The component A, the component B and the component C are components defined in order of short relaxation time in pulse NMR measurement. Although each value of the relaxation time is not particularly limited, the normal relaxation time is less than 0.02 milliseconds for the component A, 0.02 milliseconds or more and less than 0.1 milliseconds for the component B, and 0.1 milliseconds or more for the component C.

<Solid Echo Method>
 Scans: 128 times
 Recycle delay: 1 sec
 Acquisition scale: 1 ms (2) Presence/Absence of Wrinkles and Coalescence in the PVA Film A PVA film obtained in each of Examples and Comparative Examples was immersed in water at 30° C. for 1 minute and then taken out to evaluate the presence/absence of wrinkles and coalescence in the PVA film.

[Criteria of Wrinkles and Coalescence]
 A: Wrinkles and coalescence are absent.
 B: Wrinkles are present, while coalescence is absent.
 C: Wrinkles and coalescence are present.

(3) Measurement of Degree of Polarization

The degree of polarization P of a polarizing film obtained in Examples and Comparative Examples was evaluated by the following equation using a spectrophotometer "UV-3101PC" manufactured by Shimadzu Corporation. YP (parallel transmittance) is the transmittance of films superimposed to each other in parallel with the stretching direction of the film, and YC (cross transmittance) is the transmittance of films superimposed to each other in orthogonal to the stretching direction of the film.

$$\text{Degree of polarization } P(\%) = \{(YP-YC)/(YP+YC)\}^{1/2} \times 100$$

[Criteria of Degree of Polarization]
 A: degree of polarization of 99 or more
 B: degree of polarization of 90 or more and less than 99
 C: degree of polarization of less than 90

Synthesis Example 1

[PVA1 (Degree of Saponification: 99.5 mol %, Degree of Polymerization: 2700)]

Into a reaction vessel equipped with a thermometer, a stirrer and a cooling tube, 2000 parts by mass of vinyl acetate monomer and 200 parts by mass of methanol were added, and after nitrogen purge with nitrogen gas blown in for 30 minutes, the reaction vessel was heated at 60° C. for 30 minutes. Subsequently, 0.4 parts by mass of 2,2'-azobisisobutyronitrile as polymerization initiator was added thereto and then let the reaction proceed at 60° C. for 4 hours. After completion of the reaction time, the reaction liquid was cooled. The polymerization ratio was 29% based on the measurement of the polymerization ratio after cooling. Subsequently, an operation for removing the residual vinyl acetate monomer together with methanol under reduced pressure was performed along with addition of methanol, so that a methanol solution containing 50 mass % of polyvinyl acetate was obtained. To the methanol solution, a methanol solution of sodium hydroxide was added to obtain a sodium hydroxide content of 0.08 mol % based on vinyl acetate, and saponification was performed at 40° C. The resulting solid content was pulverized, washed with methanol, and then dried to obtain PVA1. The resulting PVA1 was subjected to measurement of the degree of saponification and the degree of polymerization in accordance with JIS K 6726 to obtain 99.5 mol % and 2700, respectively.

Synthesis Example 2

[PVA2 (Degree of Saponification: 98.5 Mol %, Degree of Polymerization: 1200)]

Into a reaction vessel equipped with a thermometer, a stirrer and a cooling tube, 2000 parts by mass of vinyl acetate monomer and 200 parts by mass of methanol were added, and after nitrogen purge with nitrogen gas blown in for 30 minutes, the reaction vessel was heated at 60° C. for 30 minutes. Subsequently, 0.65 parts by mass of 2,2'-azobisisobutyronitrile as polymerization initiator was added thereto and then let the reaction proceed at 60° C. for 4 hours. After completion of the reaction time, the reaction liquid was cooled. The polymerization ratio was 35% based on the measurement of the polymerization ratio after cooling. Subsequently, an operation for removing the residual vinyl acetate monomer together with methanol under reduced pressure was performed along with addition of methanol, so that a methanol solution containing 50 mass % of polyvinyl acetate was obtained. To the methanol solution, a methanol solution of sodium hydroxide was added to obtain a sodium hydroxide content of 0.07 mol % relative to vinyl acetate, and saponification was performed at 40° C. The resulting solid content was pulverized, washed with methanol, and then dried to obtain PVA2. The resulting PVA2 was subjected to measurement of the degree of saponification and the degree of polymerization in accordance with JIS K 6726 to obtain 98.5 mol % and 1200, respectively.

Example 1

(Manufacturing of PVA Film)

Into a reaction vessel equipped with a thermometer, a stirrer and a cooling tube, 1000 parts by mass of water was fed at 25° C., and 100 parts by mass of PVA1 and 10 parts by mass of polyethylene glycol having an average molecular weight of 400 were fed therein while stirring. The mixture liquid was heated to 95° C. and retained at 95° C. for 60 minutes, so that PVA1 and polyethylene glycol were dissolved in water. The mixture liquid (PVA solution) was then cooled down to 35° C. at a temperature lowering rate of 0.5° C./minute. The PVA solution cooled to 35° C. was applied to a glass plate having a thickness of 7 mm, dried at 70° C. for 2 hours, and then detached from the glass plate to obtain a PVA film having a thickness of 15 μm. From the resulting film, 10 g of the film was cut out to be subjected to 100 cycles of Soxhlet extraction with methanol. The resulting resin was then subjected to measurement of the degree of saponification and the degree of polymerization in accordance with JIS K 6726 to obtain 99.5 mol % and 2700, respectively.

(Manufacturing of Polarizing Film)

Next, while immersing the resulting PVA film in an aqueous solution dissolving iodine ($I_2$) and potassium iodide (KI) at 25° C. for 60 seconds, stretching was performed at a stretching ratio of 5 times. The aqueous solution comprised 0.4 parts by mass of iodine, 40 parts by mass of potassium iodide and 1000 parts by mass of water. The PVA film was then immersed in a boric acid aqueous solution with a concentration of 4.0 mass % at 25° C. for 5 minutes, washed with water after pulling out from the aqueous solution, and then dried in a drying oven set at 70° C. to obtain a polarizing film.

Example 2

(Manufacturing of PVA Film)

Into a reaction vessel equipped with a thermometer, a stirrer and a cooling tube, 1000 parts by mass of water was fed at 25° C., and 100 parts by mass of PVA1 and 10 parts by mass of trimethylol propane were fed therein while stirring. The mixture liquid was heated to 95° C. and retained at 95° C. for 60 minutes, so that PVA1 and trimethylol propane were dissolved in water. The mixture liquid (PVA solution) was then cooled down to 35° C. at a temperature lowering rate of 0.5° C./minute. The PVA solution cooled to 35° C. was applied to a glass plate having a thickness of 7 mm, dried at 70° C. for 2 hours, and then detached from the glass plate to obtain a PVA film having a thickness of 15 μm. From the resulting film, 10 g of the film was cut out to be subjected to 100 cycles of Soxhlet extraction with methanol. The resulting resin was then subjected to measurement of the degree of saponification and the degree of polymerization in accordance with JIS K 6726 to obtain 99.5 mol % and 2700, respectively.

(Manufacturing of Polarizing Film)

Next, a polarizing film was manufactured from the resulting film in the same manner as in Example 1.

Examples 3 and 4

The procedure was performed in the same manner as in Example 1, except that the amount of polyethylene glycol fed was changed as described in Table 1.

Example 5

The procedure was performed in the same manner as in Example 1, except that the PVA solution was cooled down to 50° C. at a temperature lowering rate of 0.5° C./minute, and the PVA solution cooled to 50° C. was applied to a glass plate having a thickness of 7 mm.

Example 6

The procedure was performed in the same manner as in Example 1, except that the temperature lowering rate in cooling of the PVA solution down to 35° C. was changed to 1° C./minute and the PVA solution applied to the glass plate was dried at 70° C. for 1 hour.

Example 7

The procedure was performed in the same manner as in Example 6, except that 10 parts by mass of glycerol was fed into the reaction vessel instead of 10 parts by mass of polyethylene glycol.

Comparative Example 1

(Manufacturing of PVA Film)

Into a reaction vessel equipped with a thermometer, a stirrer and a cooling tube, 1000 parts by mass of water was fed at 25° C., and 100 parts by mass of PVA2 and 30 parts by mass of polyethylene glycol having an average molecular weight of 400 were fed therein while stirring. The mixture liquid was heated to 95° C. and retained at 95° C. for 120 minutes, so that PVA2 and polyethylene glycol were dissolved in water. The mixture liquid (PVA solution) was then cooled down to 35° C. at a temperature lowering rate of 1° C./minute. The PVA solution cooled to 35° C. was applied to a glass plate having a thickness of 7 mm, dried at 80° C. for 1 hour, and then detached from the glass plate to obtain a PVA film having a thickness of 15 μm. From the resulting film, 10 g of the film was cut out to be subjected to 100 cycles of Soxhlet extraction with methanol. The resulting resin was then subjected to measurement of the degree of saponification and the degree of polymerization in accordance with JIS K 6726 to obtain 98.5 mol % and 1200, respectively.

(Manufacturing of Polarizing Film)

Next, a polarizing film was manufactured from the resulting film in the same manner as in Example 1.

Comparative Example 2

The procedure was performed in the same manner as in Example 1, except that the temperature lowering rate in cooling the PVA solution down to 35° C. was changed to 1° C./minute, and the PVA solution applied to a glass plate was dried at 80° C. for 30 minutes.

TABLE 1

|  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|
| PVA solution composition (parts by mass) | PVA | 100 | 100 | 100 | 100 | 100 | 100 | 100 | 100 | 100 |
|  | Plasticizer | 10 | 10 | 15 | 5 | 10 | 10 | 10 | 30 | 10 |
|  | Water | 1000 | 1000 | 1000 | 1000 | 1000 | 1000 | 1000 | 1000 | 1000 |
| PVA properties | Degree of saponification (mol %) | 99.5 | 99.5 | 99.5 | 99.5 | 99.5 | 99.5 | 99.5 | 98.5 | 99.5 |
|  | Degree of polymerization | 2700 | 2700 | 2700 | 2700 | 2700 | 2700 | 2700 | 1200 | 2700 |
| Plasticizer | Type | PEG400 | Trimethylol propane | PEG400 | PEG400 | PEG400 | PEG400 | Glycerol | PEG400 | PEG400 |
| Manufacturing conditions | Temperature raising condition | RT→95° C. | RT→95° C. | RT→95° C. | RT→95° C. | RT→95° C. | RT→95° C. | RT→95° C. | RT→95° C. | RT→95° C. |
|  | Retention time | Retained for 1 hour | Retained for 1 hour | Retained for 1 hour | Retained for 1 hour | Retained for 1 hour | Retained for 1 hour | Retained for 1 hour | Retained for 2 hours | Retained for 1 hour |
|  | Temperature lowering condition | Lowered down to 35° C. at 0.5° C./min | Lowered down to 35° C. at 0.5° C./min | Lowered down to 35° C. at 0.5° C./min | Lowered down to 35° C. at 0.5° C./min | Lowered down to 50° C. at 0.5° C./min | Lowered down to 35° C. at 1° C./min | Lowered down to 35° C. at 1° C./min | Lowered down to 35° C. at 1° C./min | Lowered down to 35° C. at 1° C./min |
|  | Application (support) | Glass plate | Glass plate | Glass plate | Glass plate | Glass plate | Glass plate | Glass plate | Glass plate | Glass plate |
|  | Drying condition | 70° C. for 2 hours | 70° C. for 2 hours | 70° C. for 2 hours | 70° C. for 2 hours | 70° C. for 2 hours | 70° C. for 1 hour | 70° C. for 1 hour | 80° C. for 1 hour | 80° C. for 0.5 hours |
| Component A | Relaxation time (milliseconds) | 0.0086 | 0.0088 | 0.009 | 0.0085 | 0.0084 | 0.0092 | 0.0092 | 0.01 | 0.0097 |
|  | Component ratio (%) | 27.6 | 28 | 20.3 | 35 | 30 | 24.9 | 24.9 | 38 | 24.5 |
| Evaluation results | Wrinkles and Coalescence | A | A | A | A | A | A | A | B | B |
|  | Degree of Polarization | A | A | A | A | A | A | A | A | A |

As shown in Examples described above, control of the relaxation time of the component A and the component ratio of the component A to specified ranges suppressed the occurrence of wrinkles and coalescence in the PVA film. Also, the resulting polarizing film had excellent polarization performance.

The invention claimed is:

1. A polyvinyl alcohol film comprising a vinyl alcohol-based polymer,
wherein, when the polyvinyl alcohol film is measured by a solid echo method using pulse NMR at 80° C. for waveform separation of a free induction decay curve of 1H spin-spin relaxation into three curves derived from three components a component A, a component B, and a component C in order of short relaxation time, the component A has:
a resulting relaxation time of 0.0083 milliseconds or more and 0.0093 milliseconds or less, and
a resulting component ratio in the NMR of 18% or more and 35% or less, the component ratio being a ratio based on a total amount of the component A, the component B, and the component C.

2. The polyvinyl alcohol film according to claim 1, wherein the vinyl alcohol-based polymer has a degree of saponification of 99 mol % or more.

3. The polyvinyl alcohol film according to claim 1, wherein the vinyl alcohol-based polymer has a degree of polymerization of 2000 or more and 4000 or less.

4. The polyvinyl alcohol film according to claim 1, comprising a plasticizer.

5. The polyvinyl alcohol film according to claim 1, for use in a polarizing film.

6. A method for manufacturing a polarizing film comprising using the polyvinyl alcohol film according to claim 1.

7. The method for manufacturing a polarizing film according to claim 6, comprising steps of dyeing the polyvinyl alcohol film, stretching the polyvinyl alcohol film, and performing a fixation treatment to the dyed polyvinyl alcohol film.

8. The method for manufacturing a polarizing film according to claim 7, wherein the fixation treatment is performed after stretching of the polyvinyl alcohol film.

* * * * *